(Model.)
W. P. O'BRIEN & W. B. O'BRIEN, Jr.
AUTOMATIC EGG BOILER.
No. 284,051. Patented Aug. 28, 1883.
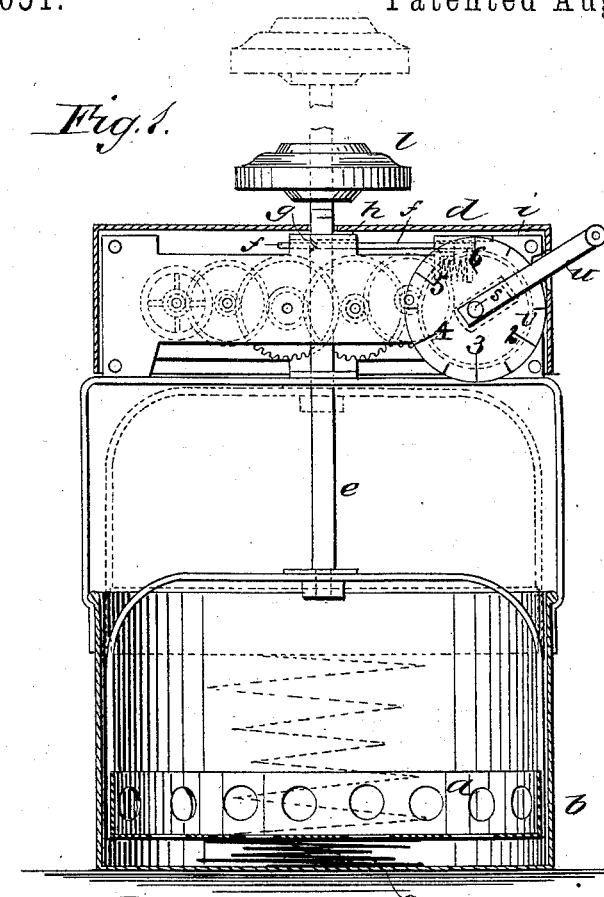
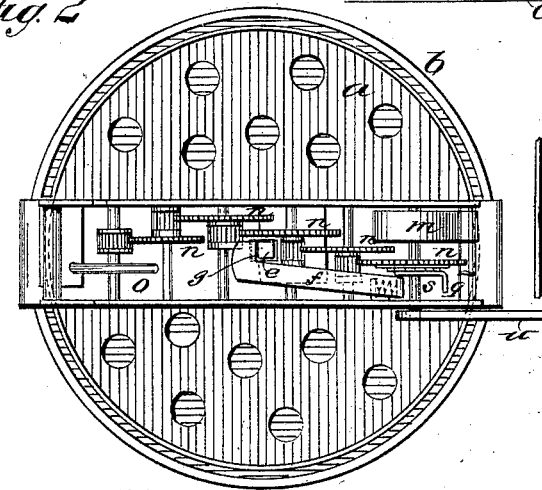
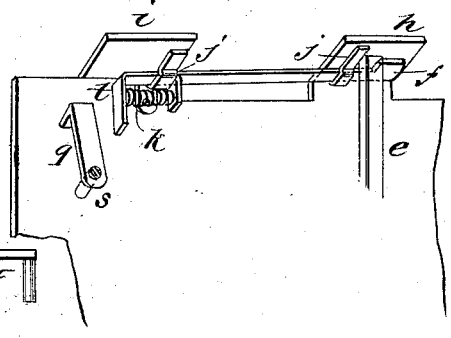
WITNESSES:
Francis McArdle
C. Sedgwick
INVENTOR:
W. P. O'Brien
W. B. O'Brien Jr.
BY Munn & Co.
ATTORNEYS.

UNITED STATES PATENT OFFICE.

WILLIAM PATRICK O'BRIEN, OF SAN JOSÉ, AND WALTER BERNARD O'BRIEN, JR., OF SANTA CLARA, CALIFORNIA.

AUTOMATIC EGG-BOILER.

SPECIFICATION forming part of Letters Patent No. 284,051, dated August 28, 1883.

Application filed May 7, 1883. (Model.)

*To all whom it may concern:*

Be it known that we, WILLIAM P. O'BRIEN, of San José, and WALTER B. O'BRIEN, Jr., of Santa Clara, in the county of Santa Clara and State of California, have invented a new and Improved Egg-Boiler, of which the following is a full, clear, and exact description.

Our invention consists of a dish made to set in the boiler on a spring that is held in check by a catch to be tripped by a spring-power time-train of gears that may be set for running the length of time the eggs are required to boil, and is provided with means for tripping the spring at the proper time, which pushes the egg-dish up out of the water, and thus automatically takes up the eggs at the precise predetermined time, and thus insures the cooking of the eggs to the required extent, all as hereinafter fully described.

Reference is to be had to the accompanying drawings, forming part of this specification, in which similar letters of reference indicate corresponding parts in all the figures.

Figure 1 is a sectional elevation of our improved egg-boiler. Fig. 2 is a horizontal section. Fig. 3 is a detail in perspective view.

The egg-dish $a$ is placed inside of a boiler, $b$, over a spring, $c$, that is to be pressed down when the eggs are to be set to boil, and held by a bar, $e$, extending up through the case $d$, attached to the boiler, in which said bar is held by a trip-catch, $f$, sliding into a notch, $g$, in the bar under the plate $h$, which, together with another plate, $i$, supports the trip-catch in cleats $j$, allowing it to shift lengthwise for connecting and disconnecting the bar $e$. The spring $k$ shifts the catch-bar into the notch of the bar $e$, when the bar is forced down by pressure on the knob $l$, and holds it there to keep the eggs in the water until cooked.

To disconnect the trip-slide $f$ from the bar and trip it for allowing the spring $c$ to lift the eggs up out of the water when cooked, we employ a spring-power device, $m$, with a regulating-train, $n$, and balance-wheel $o$, to be wound up more or less, according to the time it is to run and allow the eggs to boil, which, when having run the proper time, will push trip-catch $f$ out of the notch $g$ by the arm $q$ on the shaft $s$ of the spring device coming in contact with the bent arm $t$ of the said trip slide or catch $f$.

To set the spring-power device by winding up the spring, a crank, $u$, is attached to shaft $s$, and for gaging the crank to set the power for time a dial, $v$, is arranged for the crank to traverse it, the dial being marked to show the respective starting-points for the different periods of time for boiling, the power being gaged so that for a complete turn of the crank in winding up the power the latter will run the longest time that the eggs will be required to boil—say six minutes; but if it is wished to boil the eggs longer than the first six minutes, when such time shall have elapsed the crank may be turned again for any time desired.

Having thus described our invention, we claim as new and desire to secure by Letters Patent—

1. The combination, with an egg-dish, $a$, and boiler $b$, of the spring $c$, arranged in the bottom of the boiler, and the bar $e$, having knob $l$ at its upper end, whereby the eggs may be held under water by pressure upon the knob, and as soon as that is removed be forced up out of the water by the spring, as described.

2. The combination of the boiler $b$, egg-dish $a$, spring $c$, setting-bar $e$, trip-catch $f$, spring-power device, regulating-train, and the tripping-arm $q$ of the spring-power, substantially as described.

3. The combination, with the setting-bar $e$ and trip-catch $f$, of the spring-power device $m$, regulating-train $n$, balance-wheel $o$, crank $u$, and the graduated dial $v$, substantially as described.

WILLIAM PATRICK O'BRIEN.
WALTER BERNARD O'BRIEN, JR.

Witnesses:
ROBERT PAGE,
BYRON JENNINGS.